US008914865B2

(12) United States Patent
Beckman

(10) Patent No.: US 8,914,865 B2
(45) Date of Patent: Dec. 16, 2014

(54) DATA STORAGE AND ACCESS FACILITATING TECHNIQUES

(75) Inventor: Christopher Vance Beckman, New York, NY (US)

(73) Assignee: Loughton Technology, L.L.C., Wilmington, DE (US)

(*) Notice: Subject to any disclaimer, the term of this patent is extended or adjusted under 35 U.S.C. 154(b) by 1146 days.

(21) Appl. No.: 11/806,082

(22) Filed: May 29, 2007

(65) Prior Publication Data

US 2008/0092219 A1 Apr. 17, 2008

Related U.S. Application Data

(60) Provisional application No. 60/808,814, filed on May 27, 2006.

(51) Int. Cl.
G06F 21/00 (2013.01)
G06F 21/34 (2013.01)

(52) U.S. Cl.
CPC ........ *G06F 21/34* (2013.01); *G06F 2221/2103* (2013.01)
USPC ................................................. 726/9; 726/26

(58) Field of Classification Search
None
See application file for complete search history.

(56) References Cited

U.S. PATENT DOCUMENTS

| 1,859,492 | A | 5/1932 | Balestra |
|---|---|---|---|
| 2,577,114 | A | 12/1951 | Eames |
| 3,019,548 | A | 2/1962 | Nadler |
| 3,104,490 | A | 9/1963 | Cornell |
| 3,343,774 | A | 9/1967 | Pryor |
| 4,391,427 | A | 7/1983 | Foresman |
| 4,418,333 | A | 11/1983 | Schwartzbach et al. |
| 4,611,295 | A | 9/1986 | Fowler |
| 4,775,124 | A | 10/1988 | Hicks |
| 4,782,420 | A | 11/1988 | Holdgaard-Jensen |
| 4,993,546 | A | 2/1991 | Southard |
| 5,020,753 | A | 6/1991 | Green |
| 5,029,802 | A | 7/1991 | Ali |
| 5,181,606 | A | 1/1993 | Martell |
| 5,368,268 | A | 11/1994 | Jodwischat |
| 5,417,397 | A | 5/1995 | Harnett |
| 5,642,871 | A | 7/1997 | Repert et al. |
| 5,680,929 | A | 10/1997 | Von Seidel |

(Continued)

OTHER PUBLICATIONS

Calhoun et al., "Standby Voltage Scaling for Reduced Power"; Dec. 19, 2002.

(Continued)

*Primary Examiner* — Matthew Smithers
(74) *Attorney, Agent, or Firm* — Stolowitz Ford Cowger LLP

(57) ABSTRACT

An apparatus and method for securely accessing and storing private data files and programs on a personal computing device with network access is provided. A portable data storage unit or authentication unit conjoins to a personal computing device and initiates a software program that delivers hidden authentication information to part of the network. The network then presents secure data files to the user, and enables data and program storage and access by the user. Administrator(s) may program multiple, separately-identifiable portable data storage units to permit different levels of access. When the portable data storage unit or authentication unit is no longer conjoined to the personal computing device, access and presentation of the data are terminated. The portable data storage unit may comprise a pivoting computer port-conjoining member, allowing its housing to run parallel to and lock with the personal computing device housing with a spring-loaded button and ribs along the member.

36 Claims, 3 Drawing Sheets

(56) References Cited

U.S. PATENT DOCUMENTS

| | | | |
|---|---|---|---|
| 6,152,294 | A | 11/2000 | Weinberg |
| 6,340,864 | B1* | 1/2002 | Wacyk ................... 315/158 |
| 6,351,813 | B1* | 2/2002 | Mooney et al. ........... 713/185 |
| 6,396,166 | B1 | 5/2002 | Kim |
| 6,552,888 | B2 | 4/2003 | Weinberger |
| 6,763,388 | B1 | 7/2004 | Tsimelzon |
| 6,828,695 | B1 | 12/2004 | Hansen |
| 6,956,593 | B1 | 10/2005 | Gupta et al. |
| 6,957,233 | B1 | 10/2005 | Beezer et al. |
| 6,966,445 | B1 | 11/2005 | Johanna |
| 6,992,687 | B1 | 1/2006 | Baird et al. |
| 7,020,663 | B2 | 3/2006 | Hay et al. |
| 7,181,679 | B1 | 2/2007 | Taylor |
| 7,234,104 | B2 | 6/2007 | Chang et al. |
| 7,234,108 | B1 | 6/2007 | Madan |
| 7,257,774 | B2 | 8/2007 | Denoue et al. |
| 7,388,735 | B2 | 6/2008 | Chen |
| 7,411,317 | B2 | 8/2008 | Liu |
| 7,418,656 | B1 | 8/2008 | Petersen |
| 7,447,771 | B1 | 11/2008 | Taylor |
| 7,460,150 | B1 | 12/2008 | Coughlan et al. |
| 7,496,765 | B2* | 2/2009 | Sengoku ................... 713/189 |
| 7,505,237 | B2 | 3/2009 | Baxter |
| 7,506,246 | B2 | 3/2009 | Hollander et al. |
| 7,594,187 | B2 | 9/2009 | Baird et al. |
| 7,650,565 | B2 | 1/2010 | Ford |
| 7,716,224 | B2 | 5/2010 | Reztlaff et al. |
| 7,738,684 | B2 | 6/2010 | Kariathungal |
| 7,778,954 | B2 | 8/2010 | Rhoads |
| 7,783,077 | B2 | 8/2010 | Miklos et al. |
| 7,783,979 | B1 | 8/2010 | Leblang |
| 7,800,251 | B2 | 9/2010 | Hodges |
| 7,810,042 | B2 | 10/2010 | Keely |
| 7,821,161 | B2 | 10/2010 | Beckman |
| 7,859,539 | B2 | 12/2010 | Beckman |
| 7,889,464 | B2 | 2/2011 | Chen et al. |
| 7,940,250 | B2 | 5/2011 | Forstall |
| 7,999,415 | B2 | 8/2011 | Beckman |
| 8,000,074 | B2 | 8/2011 | Jones |
| 8,004,123 | B2 | 8/2011 | Hodges |
| 8,006,387 | B2 | 8/2011 | Watts |
| 8,028,231 | B2 | 9/2011 | Jeffrey |
| 8,209,605 | B2 | 6/2012 | Poston et al. |
| 8,302,202 | B2* | 10/2012 | Dawson ................... 726/27 |
| 8,332,742 | B2 | 12/2012 | Taylor |
| 8,410,639 | B2 | 4/2013 | Beckman |
| 8,631,009 | B2 | 1/2014 | Lisa et al. |
| 2001/0016895 | A1* | 8/2001 | Sakajiri et al. ............ 711/115 |
| 2003/0050927 | A1 | 3/2003 | Hussam |
| 2003/0135520 | A1 | 7/2003 | Mitchell |
| 2005/0055405 | A1 | 3/2005 | Kaminsky et al. |
| 2005/0066069 | A1* | 3/2005 | Kaji ........................ 710/1 |
| 2005/0182973 | A1* | 8/2005 | Funahashi et al. ......... 713/202 |
| 2005/0193188 | A1* | 9/2005 | Huang ..................... 713/1 |
| 2006/0107062 | A1* | 5/2006 | Fauthoux .................. 713/182 |
| 2006/0163344 | A1* | 7/2006 | Nwosu ..................... 235/380 |
| 2006/0173819 | A1 | 8/2006 | Watson |
| 2006/0176146 | A1* | 8/2006 | Krishan et al. ............ 340/5.53 |
| 2006/0206720 | A1* | 9/2006 | Harada et al. ............. 713/182 |
| 2006/0226950 | A1* | 10/2006 | Kanou et al. .............. 340/5.61 |
| 2006/0273663 | A1 | 12/2006 | Emalfarb |
| 2007/0006322 | A1* | 1/2007 | Karimzadeh et al. ....... 726/27 |
| 2007/0016941 | A1* | 1/2007 | Gonzalez et al. .......... 726/9 |
| 2007/0045417 | A1* | 3/2007 | Tsai et al. ................. 235/441 |
| 2008/0086680 | A1 | 4/2008 | Beckman |
| 2008/0088293 | A1 | 4/2008 | Beckman |
| 2011/0012580 | A1 | 1/2011 | Beckman |
| 2011/0298303 | A1 | 12/2011 | Beckman |
| 2013/0175880 | A1 | 7/2013 | Beckman |

OTHER PUBLICATIONS

Stolowitz Ford Cowger LLP, Listing of Related Cases, Nov. 4, 2011.

Internet Archive Wayback Machine, disclosing site retrieval for http://lexisnexis.com in 2005, 1 page.

Lexis Nexis, "LexisNexis Citation Tools 2001", copyright 2002, LexisNexis, p. 1-8. (discloses checking citations for positive and negative treatments).

LexisNexis, "Shepard's Citations Review", Apr. 30, 2004, p. 1-2.

LexisNexis, "Shepard's Citations Service", copyright 2003, p. 1-2.

SVT Technologies, "SVT Lighting Control Products", May 4, 2006; http://www.svt-tech.com/lightingcontrol.html.

California Energy Commission, "Small Appliances", Mar. 6, 2001; http://www.consumerenergycenter.org/homeandwork/homes/inside/appliances/small.html.

Energyrating.gov.au, "The Leaking Electricity Initiative: an International Action to Reduce Standby Power Waste of Electrical Equipment", Jul. 9, 2005; http://www.energyrating.gov.au/library/pubs/cop5-leaking.pdf.

Bits Limited, "The Leg3", Jan. 1, 2007; http://catalog.bitsltd.us/catalog/SMART/LEG3.html.

Stolowitz Ford Cowger LLP; Related Case Listing; Feb. 10, 2014, Portland, OR; 1 page.

Heinzmann et al.: 3-D Facial Pose and Gaze-Point Estimation Using a Robust real-Time Tracking Paradigm; 1998; pp. 1-6.

Kim et al.; Vision-Based Eye-Gaze Tracking for Human Computer Interface, IEEE; 1999; pp. 324-329.

Fono et al.; EyeWindows: Evaluation of Eye-Controlled Zooming Windows for Focus Selection; CHI—2005; pp. 151-160.

Jacob; The Use of eye Movements in Human-Computer Interaction Techniques: What You Look At Is What You Get; ACM Transactions on Information Systems, vol. 9, No. 3; 1991; pp. 152-169.

* cited by examiner

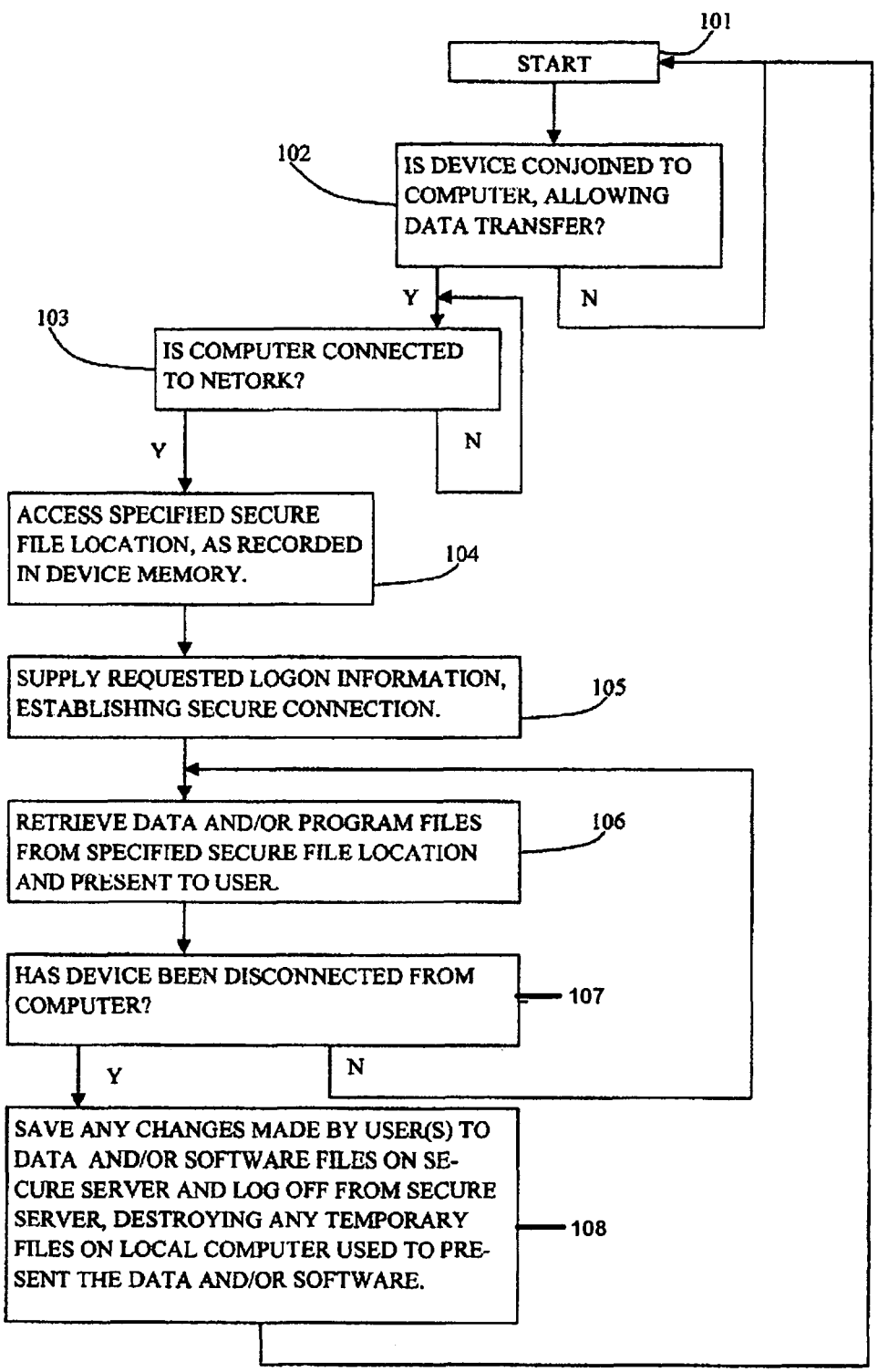
Figure One

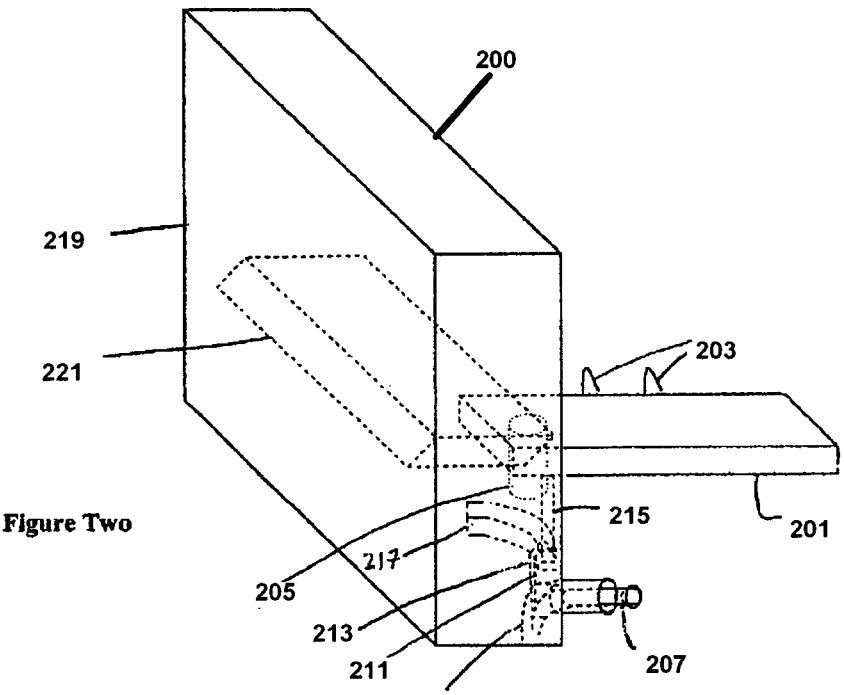
Figure Two
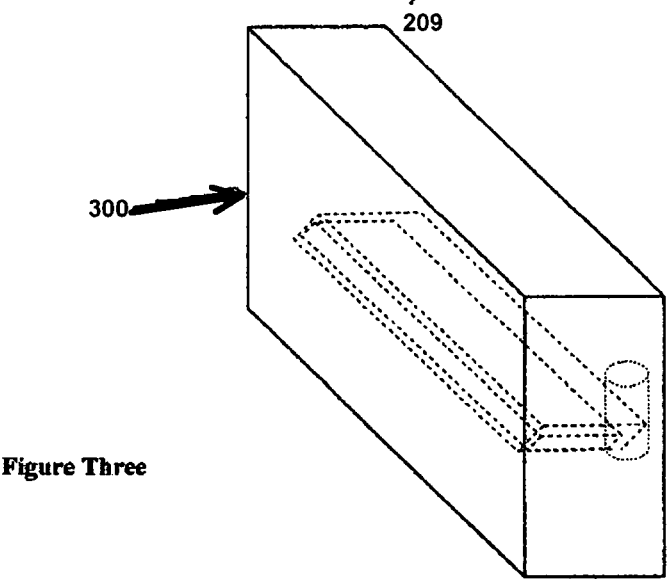
Figure Three

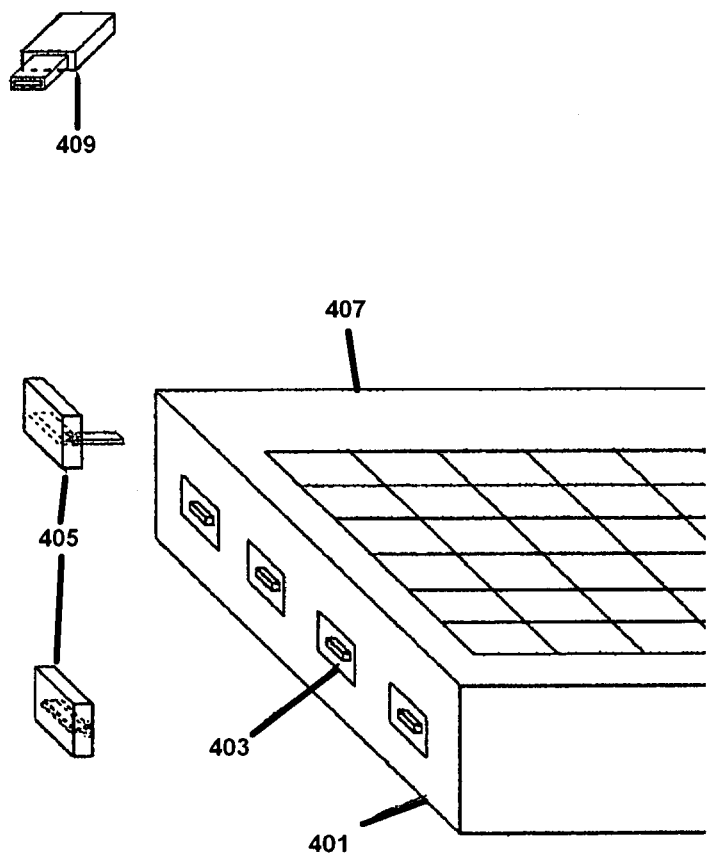
Figure Four

DATA STORAGE AND ACCESS FACILITATING TECHNIQUES

CROSS-REFERENCE TO RELATED APPLICATION

This application claims the benefit of U.S. Application No. 60/808,814, filed May 27, 2006.

SUMMARY OF THE INVENTION

The present invention relates to an apparatus and method for automatically and securely accessing and storing private data files and programs on a personal computing device with internet or other network access. In a preferred embodiment, a small, key-shaped data storage drive (also referred to as a "portable data storage unit conjoinable to a system of one or more computers" or "Key Device") interfaces with a personal computer via a Uniform Serial Bus ("USB") port, or other such computer/hardware communication means, and thereupon automatically initiates a software program containing user authentication information located on the Key Device and therewith automatically accesses a secure server located on the internet that accesses and presents to the user (via the personal computer) secure, private data and program files stored on the secure server. The data or program files may be presented in ways that private data files ordinarily are presented on a personal computer—represented by a disk drive or file icon, such as a file icon located on the "desktop" of a personal computer or as a subdivision of a data directory (e.g. "My Computer," within Microsoft Windows). Preferably, the presentation and access discussed above terminates automatically upon removal of the Key Device, preventing unauthorized access to the private data by other users of the same personal computing device.

Thus, the apparatus and method allow the user to automatically access virtually unlimited secure, private data files from an unlimited number of personal computers with internet or other network access, without carrying fragile, cumbersome diskettes or other such data devices that are subject to the risk of physical loss, while eliminating the time-consuming, labor-intensive memorization, entry and navigation involved with manual entry of user authentication information (typically, a username and password) on a secure website or network.

In another preferred embodiment, multiple Key Devices may be used to allow multiple users access to the same file(s) and/or program(s) from multiple remote locations. The user authentication information may be centrally modified and/or managed by a manager of the secure server, thereby "deactivating" specific key-shaped data storage drives, accessible through a different security protocol, which allows for production of clone devices, or devices allowing some, but not all access to the secure, private data files and programs on the secure server for that purpose.

In an alternative embodiment, the data files are presented in web-page format, or in a specialized tool bar or other user/computer graphical interface. The user may alter the data or software, and the changes may be retained and reflected when a user next uses the drive to access the secure data files, from any computer with internet access. The data may be managed by one user with enhanced privileges, and made "read only" with respect to other users.

In another embodiment, once a key device is connected, and the private data files are accessed and/or presented, a program stored either on the device or the secure server automatically initiates the transfer of the private data files or software programs to temporary files on the computing device. Those files or programs may be automatically destroyed when the user disconnects the device, or stored permanently and then automatically updated to reflect any changes in the private data or software on the secure server, the next time the user(s) uses the same computer to access those files from the same computer.

The present invention may be incorporated into conventional web browsers, with "buttons" on the "toolbar" that automatically present the data files or programs in a representative icon thereof, and present the data or programs when depressed by the user with a mouse click.

In another embodiment, the device is user-programmable, allowing the user to specify web pages and/or secure log-on information for any specific websites, which the user wishes to automatically access and have available when he or she interfaces the device to a personal computing device with access to the internet.

TECHNICAL FIELD

The present invention relates to secure data storage and access techniques with respect to computer networks.

BACKGROUND OF THE INVENTION

With the increasing importance and use of information technology, a wide variety of data storage devices have been presented in the prior art. Conventionally, "local" data storage devices, such as "hard disk" drives, "floppy disk" drives or "flash drives", store data files and software programs for later use by a user. Through graphical interfaces, the user may navigate through the system of a personal computing device including such a local data storage device and locate and access data stored on the local data storage device. The user can modify that data, and store new data as well.

The prior art also includes "remote" data storage techniques on another "networked" computing device, such as a server computer located on the internet which may permit a user navigating the internet on his or her personal computing device to access and/or store data on the server computer. Such a user may accomplish data storage and access via the internet using a web-based access program, which may or may not include a password and/or username secure access routine, which provides "secure" access. Typically, secure access is accomplished by a username and password field prompt; the user enters a unique username and password, which he or she keeps private, to the server which the server authenticates with a local program and, if the username and password are authentic, then presents the secure data to the user.

Each present approach to data storage in the prior art bears inherent weaknesses or drawbacks addressed by the present invention.

ASPECTS OF THE INVENTION

According to an aspect of the present invention, a portable data storage unit conjoinable to a system of one or more computers is conjoined to one or more networked computers, which, when so conjoined, causes the computer system to present the contents of a data file or files from a location in the computer system to a user and provides access and permits modification of said contents of said file by said user. In a preferred embodiment, the portable data storage device is at least partially powerable by a computer U.S.B. port, or electromagnetic radiation associated with the computer system.

The portable data storage unit is conjoined to the system whenever it may receive or give information from or to the computer system. When conjoined, the portable data storage unit detects that it is so conjoined, for example by receiving power from the system. The portable data storage unit then initiates a conjoined-initiating computer program which commands the system to locate and present particular data files to the user. The system may present such particular data files by several conventional methods, for example, by presenting a graphical representation of them on the computer screen of a computer terminal located nearby the user, or by auditory representations from a speaker located nearby the user. When the user no longer conjoins the portable data storage unit to the system, the system no longer presents the contents of a file or files from a location in the computer system to a user and provides access and permits modification of said contents of said file by said user.

In another aspect of the present invention, a user may modify the conjoined-initiating computer program to determine which particular files will be presented by the system and/or modifiable by the user or other users. The number and identity of users capable of so modifying the conjoined-initiating computer program (hereinafter, "administrators") may be limited according to a separate authentication process by the system and the program. Accordingly, administrators may program multiple data storage units conjoinable to a system, each of which may be separately identifiable and given different abilities to yield: the presentation of different data from the system, or; only some of the same data as would be summoned by other units, or; the same data as would be presented by other units but without allowing the modification of the data by some users of some units ("read only" access). This method of programming different program data storage units differently is referred to as "differentiation" in this application. The system may require fulfillment of an authentication challenge prompt, such as a "username" and "password," or any other well-known authentication routine in the art, which would be fulfilled by the conjoined-initiating computer program. The fulfillment of the authentication challenge prompt can be "hidden," meaning that the user never witnesses any presentation of the authentication challenge prompt and does not know the information required in the authentication challenge-prompt. Alternatively, the authentication challenge prompt can be presented to the user, for the user to complete with authentication data known to the user, and not stored on the unit.

In another aspect of the present invention, the system comprises more than one computing device, as in the world wide web network of computers, in which certain of those computers are "servers," providing data to other computers and users thereof. In this aspect of the invention, not all of the computers would store the data to be presented, accessed and/or modified by the user. It is also within the scope of this invention that the computers within the system may be "variably networked" in that they are only temporarily within the network and may unnetworked and renetworked at different times. It is within the scope of the present invention that a portable data storage unit conjoinable to a system would lead any of several computers within the network to present, access and permit the modification of contents of a data file or files from the computer system.

It is within the scope of this invention that an authentication unit may be conjoined to a system of one or more networked computers, which unit stores a conjoined-initiating computer program which, when an authentication routine is entered into the authentication unit, causes the computer system to display the contents of a file or files from a location in the computer system to a user and provides access and permits modification of said contents of said file by said user. In this aspect of the invention, a portable data storage unit conjoinable to a system need not be used to carry out the objectives of this invention. Rather, a biometric or other user-input authentication routine would be provided by the user to the authentication unit. The authentication unit would then cause the computer system to present the contents of a data file or files from a location in the computer system to a user and provides access and permits modification of said contents of said file by said user. A typical example of such a biometric would be to present a user's fingerprint to a scanner on the authentication unit, permitting the authentication unit to identify the user for authentication purposes.

BRIEF DESCRIPTION OF THE DRAWINGS

FIG. 1 is a diagram illustrating exemplary programming and methodology for a conjoined-initiating program of a portable data storage unit according to a preferred embodiment of the invention.

FIG. 2 is a diagram of an exemplary physical structure of a portable data storage unit in the conjoining configuration according to a preferred embodiment of the invention.

FIG. 3 is a diagram of the exemplary physical structure of the portable data storage unit of FIG. 2, in the stowed configuration.

FIG. 4 is a diagram of the physical structures illustrated in FIG. 2 and FIG. 3, in the process of being conjoined to a system of one or more computers according to a preferred embodiment of the invention.

DETAILED DESCRIPTION OF THE DRAWINGS

FIG. 1 is a diagram illustrating exemplary programming and methodology for a conjoined-initiating program of a portable data storage unit according to a preferred embodiment of the invention. In step 102, a processor of a system of one or more computers is directed to detect whether the portable data storage unit is conjoined to one of the computers within said system of one or more computers. If not, the processor returns to step 101. If the portable data storage unit is conjoined to one of the computers within said system of one or more computers, the processor proceeds to step 103. In step 103, the processor determines whether the computer to which the portable data storage unit is conjoined is connected to the remainder of said network, which, in a preferred embodiment of the invention, would consist of the internet. If not, the processor returns to the initiation of step 103. If the computer to which the portable data storage unit is conjoined is connected to the remainder of said network, the processor proceeds to step 104. In step 104, the processor accesses a particular data storage and/or program file or files, as preferably stored in the memory of the portable data storage unit. The processor then proceeds to step 105, in which the processor retrieves specified secure log-on information from the portable data storage unit, verifying authenticity of the user of the portable data storage unit. The processor then proceeds to step 106, in which it presents said particular data storage and/or program file or files to the user, preferably through a conventional user-interface, such as a computer monitor, and may permit modification thereof by the user. The processor then proceeds to step 107, in which it determines whether the portable data storage unit has been disconnected from the system of one or more computers. If not, the processor returns to the initiation of step 106. If the portable data storage unit has been disconnected from the system of one or more computers, the processor then saves any changes made by the user to said particular data storage and/or program file or files in their original location on the system of one or more computers.

FIG. 2 is a diagram of an exemplary physical structure of a portable data storage unit 200 in the conjoining configuration according to a preferred embodiment of the invention. A computer port-conjoining member 201 with gripping members 203 and a spring-loaded hinge 205 allow the portable data storage unit to physically conjoin with the system of one or more computers via a hardware access port on said system of one or more computers (not pictured). A pliable button member 207 is depressed by the physical case of a computer within said system of one or more computers when the portable data storage unit is conjoined. Said pliable button member 207 naturally resists being depressed by descending along a slope 209. Two descending ribs 211 and 213 are attached to said pliable button member and descend along with said pliable button member when said pliable button member is depressed. A pin 215 is attached to said computer port-conjoining member 201, and moves along a channel 217 when said computer port-conjoining member 201 swings into a housing 219 in a housing slot 221. If the two descending ribs (or locking members) 211 and 213 have not descended, because the pliable button member is not depressed, said pin 215 will be held against either of said descending ribs, depending on the location of said pin 215 in said channel 217, due to the force of the hinge 205, the spring of which tends to pull the port-conjoining member closed into the housing 219. Of course, if said pin 215 is positioned within said channel 217 on the side of the ribs furthest from said pliable button member 207, said pin 215 will slide along said channel 217 unobstructed by said ribs 211 and 213, and said computer port-conjoining member 201 will slide to closed position. As a user prepares to use said portable data storage unit 200, he or she will fully open said computer port-conjoining member 201 which, due to the pin 215 hitting rib 211, will be locked fully open, allowing easy conjoining of the portable data storage unit 200 with said system of one or more computers. When said conjoining has taken place, said pliable button member 207 will be depressed by the housing of a computer, causing said ribs 211 and 213 to descend, causing said pin 215 to be released and allowing force from the spring within hinge 205 to be applied to said computer port-conjoining member 201, which will pinch slightly with the housing 219. Naturally, the gripping members 203, which have now inserted within a computer port, will tend to angle backwards, creating a barb effect. Also, naturally, the pin 215 will be positioned between the two ribs 211 and 213, due to the gap or "play" between the computer housing and the housing 219. When the user begins to withdraw the portable data storage unit 200, the pliable button 207 will no longer be depressed and the rib 213 will rise, holding the computer port-conjoining member 201 from snapping shut uncontrollably. Rather, the user will depress the pliable button 207 while holding the exposed computer port-conjoining member 201, and carefully stow it within the housing 219.

FIG. 3 is a diagram of the exemplary physical structure of the portable data storage unit of FIG. 2, in the stowed configuration, as explained above.

FIG. 4 is a diagram of the physical structures illustrated in FIG. 2 and FIG. 3, in the process of being conjoined to a system of one or more computers according to a preferred embodiment of the invention. The portable data storage unit 405 conjoins with a computer port 403 to allow data transfer between said portable data storage unit 405 and said system of one or more computers 407, and/or powering of the portable data storage unit 405. An advantage can be seen over more common physical shapes and configurations for portable data storage units 407, the longer portions of the bodies of which do not run parallel to and more flush with the computer housing 401.

I claim:

1. A method comprising:
   detecting, by a processing device, a first indicia indicating that a portable data storage device is connected to a port;
   authenticating, by the processing device, authentication data received from the portable data storage unit in response to the detecting the first indicia;
   accessing, by the processing device, a data file in response to the authenticating;
   receiving, by the processing device, an input for modifying the data file in response to the accessing;
   generating by the processing device, a modified version of the data file by modifying the data file based at least in part on the input;
   detecting, by the processing device, a second indicia indicating that the portable data storage device is disconnected from the port; and
   deleting, by the processing device, a temporary data file corresponding to the data file in response to detecting the second indicia.

2. The method of claim 1, further comprising storing, by the processing device, a modified version of the data file in response to the detecting the second indicia.

3. The method of claim 1, further comprising, initiating, by the processing device, an application program configured to authenticate the authentication data in response to detecting the first indicia.

4. The method of claim 1, further comprising terminating, by the processing device, the accessing the data file in response to the detecting the second indicia.

5. The method of claim 1, wherein the port is a local port.

6. The method of claim 1, wherein the port is associated with a remote network device.

7. The method of claim 1, further comprising, displaying, by the processing device, the data file in response to the accessing.

8. The method of claim 7, further comprising, terminating, by the processing device, the displaying the data file in response to the second indicia.

9. The method of claim 1, further comprising, restricting, by the processing device, access to a particular data file based on the authentication data.

10. A computer-readable memory device having instructions stored thereon that, in response to execution by a processing device, cause the processing device to perform operations comprising:
   detecting a first indicia indicating that a portable data storage device is connected to an interface;
   authenticating authentication data received from the portable data storage unit in response to the detecting the first indicia;
   accessing a data file, in response to the authenticating;
   receiving an input for modifying the data file;
   generating a modified version of the data file based at least in part on applying the input to the data file;
   detecting a second indicia indicating that the portable data storage device is disconnected from the interface; and
   deleting a temporary data file corresponding to the modified data file in response to detecting the second indicia.

11. The computer-readable memory device of claim 10, wherein the operations further comprise initiating an application program configured to authenticate the authentication data.

12. The computer-readable memory device of claim 10, wherein the operations further comprise storing the modified version of the data file in response to the detecting the second indicia.

13. The computer-readable memory device of claim 10, wherein the operations further comprise terminating the accessing the data file in response to the detecting the second indicia.

14. The computer-readable memory device of claim 10, wherein the interface is associated with a local port.

15. The computer-readable memory device of claim 10, wherein the interface is associated with a remote network device.

16. The computer-readable memory device of claim 10, wherein the operations further comprise displaying the data file in response to the accessing.

17. The computer-readable memory device of claim 16, wherein the operations further comprise terminating the displaying the data file in response to the second indicia.

18. The computer-readable memory device of claim 10, wherein the operations further comprise restricting access to a particular data file based on the authentication data.

19. An apparatus comprising:
- means for detecting a first indicia indicating a portable data storage device is connected to an interface;
- means for authenticating authentication data received from the portable data storage unit in response to the detecting the first indicia;
- means for accessing a data file in response to the authenticating;
- means for receiving an input for modifying the data file;
- means for generating a modified version of the data file by modifying the data file based at least in part on the input;
- means for detecting a second indicia indicating the portable data storage device is disconnected from the interface; and
- means for deleting a temporary data file corresponding to the modified data file, in response to detecting the second indicia.

20. The apparatus of claim 19, further comprising means for initiating an application program configured to authenticate the authentication data.

21. The apparatus of claim 19, further comprising means for storing the modified version of the data file in response to the detecting the second indicia.

22. The apparatus of claim 19, further comprising means for terminating the accessing the data file in response to the detecting the second indicia.

23. The apparatus of claim 19, wherein the interface is associated with a local port.

24. The apparatus of claim 19, wherein the interface is associated with a remote network device.

25. The apparatus of claim 19, further comprising means for displaying the data file in response to the accessing.

26. The apparatus of claim 25, further comprising means for terminating the displaying the data file in response to the second indicia.

27. The apparatus of claim 19, further comprising means for restricting access to a particular data file based on the authentication data.

28. An apparatus, comprising:
- a memory device configured to store instructions associated with an application program; and
- a processing device configured to execute the instructions stored in the memory device to:
  - detect a first indicia indicating a portable data storage device is connected to an interface;
  - authenticate authentication data received from the portable data storage unit in response to the detecting the first indicia;
  - access a data file, in response to the authenticating;
  - receive an input for modifying the data file in response to the accessing;
  - generate a modified version of the data file by modifying the data file based at least in part on the input;
  - detect a second indicia indicating the portable data storage device is disconnected from the interface; and
  - delete a temporary data file corresponding to the modified data file in response to detecting the second indicia.

29. The apparatus of claim 28, wherein the processing device is further configured to execute the instructions stored in the memory device to initiate the application program in response to detecting the first indicia.

30. The apparatus of claim 28, wherein the processing device is further configured to execute the instructions stored in the memory device to store the modified version of the data file in response to the detecting the second indicia.

31. The apparatus of claim 28, wherein the processing device is further configured to execute the instructions stored in the memory device to terminate the accessing the data file in response to the detecting the second indicia.

32. The apparatus of claim 28, wherein the interface is associated with a local port.

33. The apparatus of claim 28, wherein the interface is associated with a remote network device.

34. The apparatus of claim 28, wherein the processing device is further configured to execute the instructions stored in the memory device to display the data file in response to the accessing.

35. The apparatus of claim 34, wherein the processing device is further configured to execute the instructions stored in the memory device to terminate the displaying the data file in response to the second indicia.

36. The apparatus of claim 28, wherein the processing device is further configured to execute the instructions stored in the memory device to restrict access to a particular data file based on the authentication data.

\* \* \* \* \*